United States Patent
Nam (10) Patent No.: US 12,451,837 B2
(45) Date of Patent: Oct. 21, 2025

(54) SOLAR CELL DEVICE AND COVER MEMBER APPLIED THERETO

(71) Applicant: Trina Solar Co., Ltd., Changzhou (CN)

(72) Inventor: Hyukjin Nam, Seoul (KR)

(73) Assignee: Trina Solar Co., Ltd., Changzhou (CN)

( * ) Notice: Subject to any disclaimer, the term of this patent is extended or adjusted under 35 U.S.C. 154(b) by 0 days.

(21) Appl. No.: 18/562,831

(22) PCT Filed: Oct. 29, 2021

(86) PCT No.: PCT/KR2021/015464
§ 371 (c)(1),
(2) Date: Nov. 21, 2023

(87) PCT Pub. No.: WO2023/074969
PCT Pub. Date: May 4, 2023

(65) Prior Publication Data
US 2024/0213920 A1    Jun. 27, 2024

(30) Foreign Application Priority Data
Oct. 26, 2021   (KR) .......................... 10-2021-0143805

(51) Int. Cl.
*H02S 40/34*        (2014.01)
*H02S 40/36*        (2014.01)

(52) U.S. Cl.
CPC .............. *H02S 40/34* (2014.12); *H02S 40/36* (2014.12)

(58) Field of Classification Search
None
See application file for complete search history.

(56) References Cited

U.S. PATENT DOCUMENTS

| 2006/0180196 A1* | 8/2006 | Lares ................. H01R 13/5216 |
| | | 136/251 |
| 2008/0194154 A1* | 8/2008 | Minnick ............... H01R 13/111 |
| | | 439/842 |

(Continued)

FOREIGN PATENT DOCUMENTS

| DE | 102009023921 A1 | 10/2010 |
| DE | 102015114289 A1 | 3/2017 |

(Continued)

OTHER PUBLICATIONS

English language machine translation of Nakamura et al. (JP 2002-056922 A). (Year: 2025).*

(Continued)

*Primary Examiner* — Eli S Mekhlin
(74) *Attorney, Agent, or Firm* — Taft Stettinius & Hollister LLP (57) ABSTRACT

A solar power-generating device includes a plurality of solar cell modules at least including a first solar cell module and a second solar cell module adjacent to each other, and a covering member configured to protect a connection part that electrically connects the first solar cell module to the second solar cell module. Each of the plurality of solar cell modules includes a solar cell panel, a frame fixed to a peripheral portion of the solar cell panel, and a junction box including a DC output cable connected to the solar cell panel to receive DC output and transmit the received DC output to the outside. When the DC output cable of the first solar cell module and the DC output cable of the second solar cell module are connected to each other by connectors to realize the connection part, the covering member seals and protects the connection part.

19 Claims, 8 Drawing Sheets

(56) References Cited

U.S. PATENT DOCUMENTS

2010/0075531 A1     3/2010   Beck et al.
2017/0317644 A1*   11/2017   Thakre .................... H02S 20/25

FOREIGN PATENT DOCUMENTS

| JP | 2000200919 A | 7/2000 |
| JP | 2002056922 A | 2/2002 |
| JP | 2007086180 A | 4/2007 |
| JP | 2015138875 A | 7/2015 |
| KR | 20070110330 A | 11/2007 |
| KR | 20150146197 A | 12/2015 |
| KR | 20170090089 A | 8/2017 |

OTHER PUBLICATIONS

International Search Report (PCT/KR2021/015464); Date of Mailing: Jul. 21, 2022.
European Patent Office, Search Report issued in corresponding Application No. 21962593.6, dated Jan. 22, 2025, 8 pp.
Japanese Patent Office, Office Action issued in corresponding Application No. 2024-525003, dated Apr. 8, 2025, 6 pp.

* cited by examiner

SOLAR CELL DEVICE AND COVER MEMBER APPLIED THERETO

CROSS REFERENCE TO RELATED APPLICATIONS

The present application is a national phase of International Application No. PCT/KR2021/015464, filed on Oct. 29, 2021, which claims priority to Korean Patent Application No. 10-2021-0143805, filed on Oct. 26, 2021, the contents of which are incorporated herein by reference in their entireties.

TECHNICAL FIELD

The present disclosure relates to a solar cell device and a connector covering member applied to the same, and in particular, to a solar cell device with an improved connection structure and a connector covering member applied to same.

BACKGROUND

Recently, with the predicted exhaustion of existing energy resources such as oil and coal, interest in alternative energy sources is increasing. Solar cells are attracting attention as next-generation batteries that convert sunlight energy into electricity.

A solar cell panel provided with solar cells is connected to a junction box, and the junction box is connected to a DC-AC inverter through a DC output cable drawn from the junction box. For example, a DC voltage or DC current transmitted through an output cable of a (+) terminal and an output cable of a (−) terminal drawn from the junction box is converted into an AC voltage or AC current by the DC-AC inverter. In this case, a plurality of solar cell panels may be used at the same time by connecting one solar cell panel to an adjacent solar cell panel, and various solar cell panels may be connected to each other for use as required.

In this case, output of the plurality of solar cell panels is connected in series in a manner of connecting the output cables of the (+) terminals of the junction boxes of the solar cell panels and the output cables of (−) terminals adjacent thereto in series with each other and then is connected to a DC-AC inverter, so that AC power can also be outputted.

The connection between the output cables configured to connect output of the junction boxes of adjacent solar cell panels in series with each other as described above can be achieved in a variety of manners and can be achieved by a male-female connection, socket connections, or the like.

The terminals of the two output cables connected as described above are exposed to various environments outside.

As an example, corrosion and electrical damages caused by moisture due to exposure to the external environment become a problem, and various physical external impacts cannot be withstood.

That is, there is a risk of various climate changes from gusts, cold waves, snowfall, and the like, and also a risk of physical collisions from the outside.

To prevent this situations, protectors have been proposed in various manners.

A general protector has a plastic body that surrounds two connected terminals and then is attached with an adhesive for sealing, so as to protect the terminals.

However, this type of protector is fixed by the adhesive and is non-detachable, whereby partial replacement is impossible and there are difficulties in maintenance and the like in case of failures. In addition, there is a disadvantage of difficult assembling due to the need of the adhesive.

In addition, a sealing cover surrounding a connection part 90 of two terminals is disclosed in Korean Patent Publication No. 10-1158500. In the case of the sealing cover as described above, after the two terminals are joined, the sealing cover screwed with outer surfaces of the terminals is provided separately, thereby protecting the connection part again.

However, in view of the conventional technology as described above, corrosion due to moisture or the like at the connection part can be prevented, but there is a problem that it is difficult to protect the entire terminal from damages due to physical impacts or the like.

PRIOR ART REFERENCE

Patent Reference

Korean Patent Publication No. 10-1158500 (registered on Jun. 14, 2012)

SUMMARY

Technical Problem

The present disclosure is intended to provide a solar cell module capable of simplifying the connection structure with respective solar cell modules and/or inverters that are structurally simple and adjacent to each other, and a solar power-generating device including same.

The present disclosure is intended to provide a covering member that strengthens connections between adjacent solar cell modules and/or inverters, is easily dissembled and assembled, and thus can provide protection from the exterior.

In addition, the present disclosure is intended to provide a connector covering member that is fastened by joining after the covering member is manufactured by dividing into an upper part and a lower part, so that detachment and fastening are easy, repair is possible, and the service life can be prolonged while mechanical reliability is improved.

Means of Solving the Technical Problem

A solar power-generating device according to some embodiments of the present disclosure includes a plurality of solar cell modules at least including a first solar cell module and a second solar cell module adjacent to each other, and a covering member configured to protect a connection part that electrically connects the first solar cell module to the second solar cell module. Each of the plurality of solar cell modules includes a solar cell panel, a frame fixed to a peripheral portion of the solar cell panel, and a junction box including a DC output cable connected to the solar cell panel to receive DC output and transmit the received DC output to the outside. When the DC output cable of the first solar cell module and the DC output cable of the second solar cell module are connected to each other by connectors to realize the connection part, the covering member seals and protects the connection part.

In one or more embodiments, the covering member may include a lower covering member covering a lower part of the connection part, and an upper covering member covering an upper part of the connection part and coupled with the lower covering member to seal the connection part.

In one or more embodiments, the lower covering member may have a same shape as the upper covering member.

In one or more embodiments, the lower covering member may include a concave portion accommodating the connection part, and a flange portion extending around the concave portion and abutting against the upper covering member.

In one or more embodiments, in the lower covering member, a cable portion accommodating the DC output cable connected from the connection part may be arranged at two ends of the concave portion.

In one or more embodiments, the connector of the first solar cell module and the connector of the second solar cell module are connected to each other to form the connection part and are accommodated in the concave portion, and the DC output cable connected to one end of the connector is accommodated in a cable concave portion of the cable portion.

In one or more embodiments, the flange portion may further include a sealing portion surrounding the concave portion and externally sealing the concave portion.

In one or more embodiments, the sealing portion may protrude at a predetermined height from the flange portion.

In one or more embodiments, the sealing portion may have lower hardness than the flange portion and the concave portion.

In one or more embodiments, the lower covering member may further include a plurality of latch portions protruding upwards from an edge of the flange portion and joining with the upper covering member.

In one or more embodiments, the plurality of latch portions are spaced apart and staggered from each other by taking the concave portion as the center.

In one or more embodiments, the flange portion may further include protrusions protruding downwards at positions facing the latch portions.

In one or more embodiments, in the upper covering member and the lower covering member arranged to accommodate the connection part, the latch portions may be coupled to the protrusions.

In one or more embodiments, the plurality of latch portions of the lower covering member may be spaced apart from and facing each other by taking the concave portion as the center.

In one or more embodiments, the upper covering member may include a plurality of protrusions protruding upwards to correspond to the plurality of latch portions of the lower covering member.

In addition, some embodiments of the present disclosure provide a connector covering member for a solar cell device. The connector covering member for a solar cell device is configured to protect a connection part electrically connecting solar cell modules adjacent to one another. The connector covering member for a solar cell device includes a lower covering member covering a lower part of the connection part and an upper covering member covering an upper part of the connection part and coupled with the lower covering member to seal the connection part.

In one or more embodiments, the lower covering member or the upper covering member may include a body portion including a concave portion formed for accommodating the connection part, and a cable concave portion formed for accommodating a DC output cable protruding to two ends of the concave portion and connected to the connection part; and a flange portion extending around the concave portion and the cable concave portion and abutting against the upper covering member or the lower covering member.

In one or more embodiments, a connector of one solar cell module and a connector of another solar cell module are in contact with each other to form the connection part which is accommodated in the concave portion, and the DC output cable is connected to one end of the corresponding connector and is accommodated in the cable concave portion.

In one or more embodiments, the flange portion may further include a sealing portion surrounding the concave portion and protruding at a predetermined height to externally seal the concave portion, and the sealing portion is integrally formed in the cable concave portion.

In one or more embodiments, the lower covering member may further include a plurality of latch portions protruding upwards from an edge of the flange portion and joining the upper covering member, and a plurality of protrusions protruding downwards at positions facing the plurality of latch portions.

DESCRIPTION OF EMBODIMENTS

Embodiments of the present disclosure will be described in detail below with reference to the accompanying drawings. However, the present disclosure is not limited to such embodiments, and may be modified into various forms.

In order to clearly and concisely explain the present disclosure, illustration of parts irrelevant to the description in the accompanying drawings is omitted, and throughout the specification, same reference signs are used for same or very similar parts. In addition, in order to make the description clearer, the thickness, the width, and the like are enlarged or reduced and shown in the accompanying drawings, and the thickness, the width, and the like in the present disclosure are not limited to those shown in the accompanying drawings.

Moreover, throughout the specification, when a portion is referred to as "including" another portion, the other portion is not excluded and may be included unless otherwise specifically stated. In addition, when a portion of a layer, a film, a region, a panel, or the like is "on" another portion, this includes not only being "directly on" the other portion, but also having another portion positioned therebetween. When a portion of a layer, a film, a region, a panel, or the like is referred to as being "directly on" another portion, it means that no other portion is positioned therebetween.

A solar cell module and a solar power-generating device thereof according to some embodiments of the present disclosure will be described in detail below with reference to the accompanying drawings.

Figure 1:
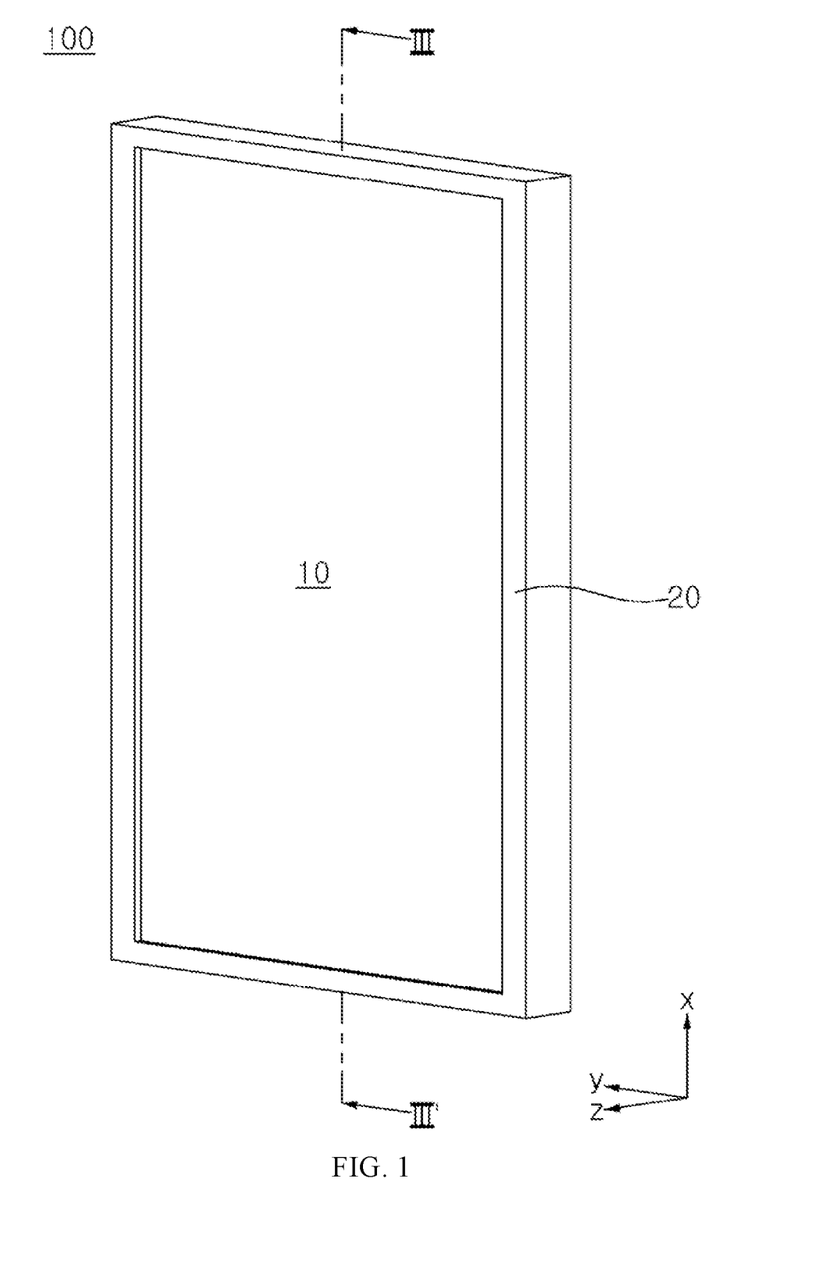
FIG. 1 is a front perspective view showing a solar cell module according to some embodiments of the present disclosure.
Figure 2:
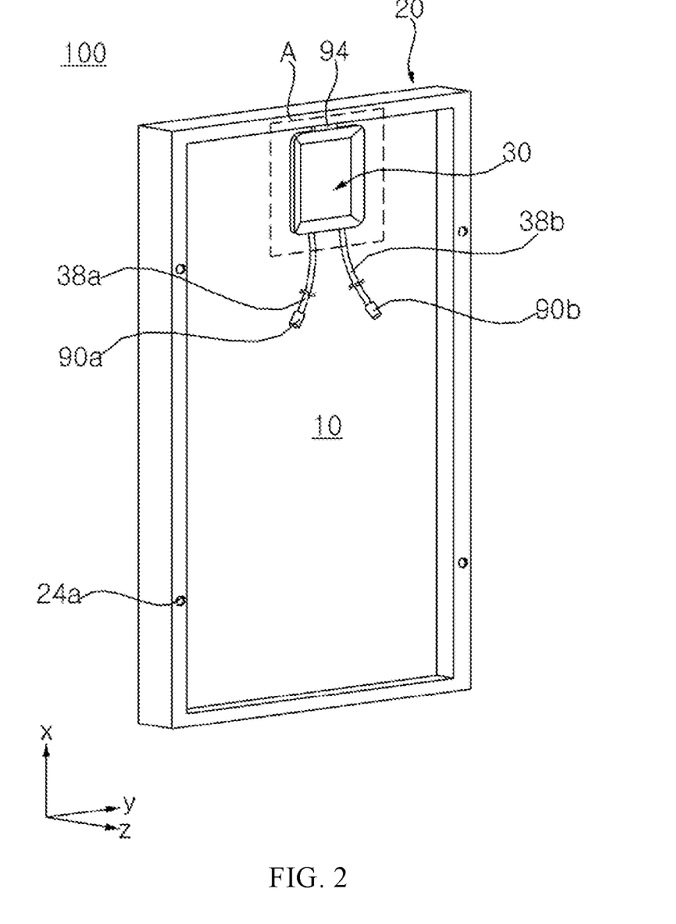
FIG. 2 is a rear perspective view showing the solar cell module in FIG. 1.
Figure 3:
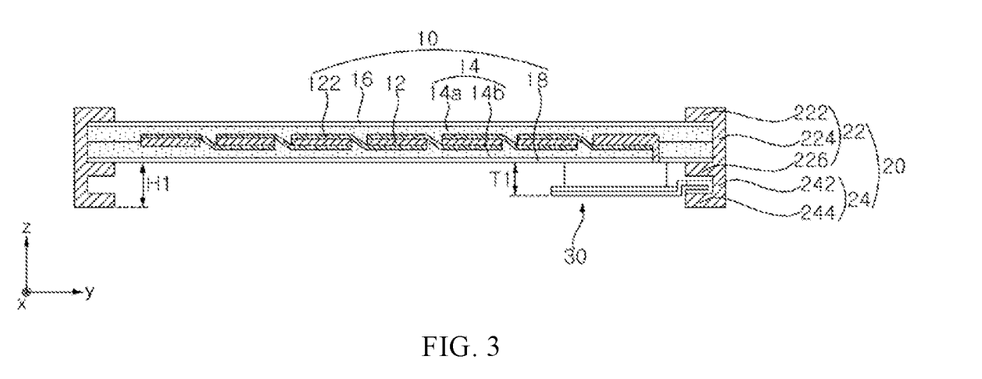
FIG. 3 is a sectional view taken along a line III-III' in FIG. 1.
Figure 4:
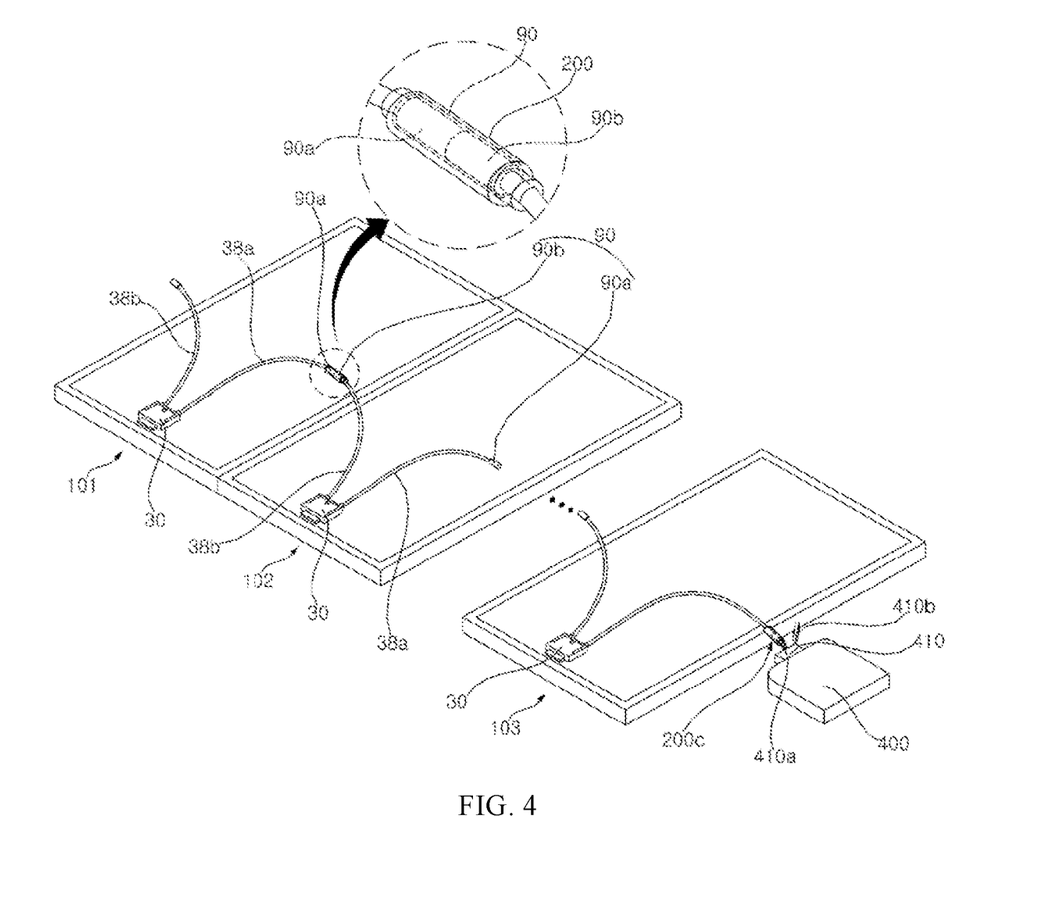
FIG. 4 is a perspective view showing a solar power-generating device formed by connecting the solar cell module in FIG. 1 to adjacent solar cell modules.

FIG. 1 is a front perspective view showing a solar cell module according to some embodiments of the present disclosure, FIG. 2 is a rear perspective view showing the solar cell module in FIG. 1, FIG. 3 is a sectional view taken along a line III-III' in FIG. 1, and FIG. 4 is a perspective view showing a solar power-generating device formed by connecting the solar cell module in FIG. 1 to adjacent solar cell modules.

First, referring to FIG. 1 to FIG. 3, a solar cell module 100 according to some embodiments includes a solar cell panel 10 including a solar cell 12, and a junction box 30 connected to the solar cell panel 10 and including a DC output cable 38. The solar cell module 100 may include a frame 20 fixing a peripheral portion of the solar cell panel 10. A sealing member (not shown) for sealing and adhesion may be positioned between the solar cell panel 10 and the frame 20.

In the following, the solar cell panel 10 and the frame 20 are described with reference to FIG. 1 to FIG. 3, and a connection structure of the solar cell module 100 for connecting a plurality of solar cell modules is described with reference to FIG. 4.

The solar cell panel 10 includes at least one solar cell 12. Moreover, the solar cell panel 10 may include a sealing layer 14 surrounding and sealing the solar cell 12, a front substrate 16 on one side of the sealing layer 14 and on a front surface of the solar cell 12, and a back substrate 18 on the other side of the sealing layer 14 and on a back surface of the solar cell 12.

As an example, the solar cell 12 may include (e.g., a single crystal semiconductor substrate, or a single crystal silicon wafer), a first conductive region and a second conductive region formed in the semiconductor substrate or on the semiconductor substrate and having conductivity types opposite to each other, and a first electrode and a second electrode respectively connected thereto. Herein, the semiconductor substrate may have a p type or an n type with low doping concentration. In the first conductive region and the second conductive region, one may have a p type, and the other may have an n type. Moreover, the first conductive region or the second conductive region may also be configured as a doping region formed by doping a dopant into part of the semiconductor substrate, and may be formed by a semiconductor layer which is separately formed on the semiconductor substrate and doped with the dopant. In addition, a plurality of solar cells 12 may be provided, the first electrode of one solar cell 12 and the second electrode of the solar cell 12 adjacent thereto may be connected through a solder strip 122 or the like to form a solar cell string. The structure of the solar cell 12, the connection structure of the plurality of solar cells 12, and the like may be applied to various known structures.

As described above, a silicon single crystal semiconductor solar cell is used as the solar cell 12 is taken as an example. However, the present disclosure is not limited thereto, and solar cells of various structures such as thin-film solar cells, dye-sensitized solar cells, tandem solar cells, and compound semiconductor solar cells may be used as the solar cell 12. Moreover, although a plurality of solar cells 12 are provided as an example, only one solar cell 12 may be provided in some embodiments.

A sealing layer 14 may include a first sealing layer 14a located between the solar cell 12 and the front substrate 16, and a second sealing layer 14b located between the solar cell 12 and the back substrate 18 and joining the first sealing layer 14a. The sealing layer 14 surrounds and seals the solar cell 12 to block moisture or oxygen that may adversely affect the solar cell 12. Moreover, parts (i.e., the front substrate 16, the solar cell 12, and the back substrate 18) constituting the solar cell module 100 are chemically bonded. The back substrate 18, the second sealing layer 14b, the solar cell 12 or the solar cell string, the first sealing layer 14a, and the front substrate 16 may be sequentially stacked for integration by lamination or the like in which heat and/or pressure are/is applied thereto for joining them together.

The first sealing layer 14a and the second sealing layer 14b may be made of ethylene vinyl acetate copolymer resin (EVA), polyvinyl butyral (PVB), silicone resin, ester-based resin, olefin-based resin, or the like. In this case, the first sealing layer 14a and the second sealing layer 14b may be composed of a same material, or may be composed of different materials. However, the present disclosure is not limited thereto. Therefore, the first sealing layer 14a and the second sealing layer 14b may be formed with other methods than lamination by using various other materials.

The front substrate 16 is located on the first sealing layer 14a to form the front surface of the solar cell panel 10. The front substrate 16 may be composed of a material having strength capable of protecting the solar cell 12 from external impacts and the like and a translucent property capable of transmitting light such as sunlight. As an example, the front substrate 16 may be composed of a glass substrate or the like. In this case, the front substrate 16 may also be composed of a tempered glass substrate so that the strength can be improved, and various modifications such as additionally including various materials that can improve various other properties are possible. In some other embodiments, the front substrate 16 may be a sheet or film made of resin or the like. That is, the present disclosure is not limited to the material of the front substrate 16, and the front substrate 16 may be composed of various materials.

The back substrate 18 serves as a layer on the second sealing layer 14b to protect the solar cell 12 in the back surface of the solar cell 12, which may have waterproof, insulating, and ultraviolet blocking functions.

The back substrate 18 may have strength capable of protecting the solar cell 12 from external impacts and the like, and may have a property of transmitting or reflecting light according to a desired structure of the solar cell panel 10. As an example, in the structure in which light is incident through the back substrate 18, the back substrate 18 may have a light-transmitting material, and in the structure in which light is reflected through the back substrate 18, the back substrate 18 may be made of a non-light-transmitting material, a reflective material, or the like. As an example, the back substrate 18 may be composed of a substrate form such as glass, and may be formed of a film or sheet or the like. For example, the back substrate 18 may be of a polyvinyl fluoride composite film (TPT, Tedlar/PET/Tedlar) type, or may be composed of polyvinylidene fluoride (PVDF) resin formed on at least one side of polyethylene terephthalate (PET). As a polymer having a structure of (CH$_2$CF$_2$)n, PVDF has excellent mechanical properties, weather resistance, and ultraviolet resistance due to a bi-fluorine molecular structure. The present disclosure is not limited to the material of the back substrate 18.

As described above, in order to stably fix the solar cell panel 10 composed of a plurality of layers, the frame 20 for fixing the peripheral portion of the solar cell panel 10 may be positioned. Although a situation where the peripheral portion of the solar cell panel 10 is integrally fixed to the frame 20 is shown in the figure, the present disclosure is not limited thereto. Therefore, various modifications are possible in which the frame 20 fixes only part of edges of the solar cell panel 10.

In some embodiments, the frame 20 may include a panel insertion portion 22 into which at least one part of the solar cell panel 10 is inserted, and an extension portion 24 extending from the panel insertion portion 22 towards the outside.

For example, the panel insertion portion 22 may connect a front part 222 on the front surface of the solar cell panel 10, a side part 224 on a side surface of the solar cell panel 10, and a back part 226 on the back surface of the solar cell panel 10 to each other so that the solar cell panel 10 can be enclosed inside. As an example, the first frame 141 may have a "U" cross-sectional shape or a "U" shape that bends twice so that the edge of the solar cell panel 10 is located inside. However, the present disclosure is not limited thereto, and any one or part of the front part 222, the side part 224, and the back part 226 may not be positioned. Various other modifications are possible.

The extension portion 24 extending backwards from the panel insertion portion 22 may include a first part 242 extending backwards from the panel insertion portion 22 and formed parallel to the side part 224 (or formed in a same plane as the side part 224), and a second part 244 bending and extending from the first part 242 and spaced from the back surface or the back part 226 of the solar cell panel 10 by a predetermined distance. The second part 244 may be formed parallel to or obliquely to the back surface or the back part 226 of the solar cell panel 10. Accordingly, the extension portion 24 may have an "L" shape or an "L" cross-sectional shape formed to bend once to form a space between the extension portion 24 and the back part 226.

The extension portion 24 as described above serves as a part that improves strength of the frame 20 and is fixed to a frame, a support, a bottom surface, or the like, and a hole (not shown) of a fastening member (not shown) for being fastened to the frame, the support, or the bottom surface may be formed in the extension portion 24. Since the fastening member and the like are fastened at the second part 244 spaced apart from the solar cell panel 10 as described above, damages to the solar cell panel 10 can be prevented when the solar cell module 100 is arranged using the fastening member.

The second part 244 may be formed to have an area equal to or larger than that of the back part 226 (i.e., have a width equal to or larger than that of the back part 226) so that the fastening member and the like can be stably fixed. Moreover, various known structures may be used for the structure of the fastening member and the like. The present disclosure is not limited thereto, and the extension portion 24 may have various other shapes.

The frame 20 may be fixed to the solar cell panel 10 in a variety of manners. As an example, a part constituting the peripheral portion of the solar cell panel 10 is formed by an elastic part (an elastic band as an example), and the solar cell panel 10 can be inserted into the panel insertion portion 22 by using the elastic part. However, the present disclosure is not limited thereto, and various modifications are possible in which parts constituting the frame 20 are assembled and joined in the peripheral portion of the solar cell panel 10.

Moreover, in some embodiments, a junction box 30 connected to the solar cell 12 of the solar cell panel 10 may be provided. As an example, the junction box 30 may be located on the back surface of the solar cell panel 10 and may be positioned adjacent to an upper end portion of the solar cell panel 10. In this case, a thickness T1 of the junction box 30 may be equal to or less than a height H1 of the extension portion 24 of the frame 20 (e.g., a height of the first part 242). Herein, the height H1 of the extension portion 24 may be defined as a distance from the back surface of the solar cell panel 10 to an outer surface of the second part 24 of the extension portion 24. Accordingly, the junction box 30 may have a thickness that may not protrude from the outer surface of the second part 244. That is, a back surface (a surface positioned away from the solar cell panel 10) of the junction box 30 may be positioned in a same plane as the outer surface of the second part 244 or positioned closer to the solar cell panel 10. Moreover, a back surface (a surface positioned away from the solar cell panel 10) of a part of the junction box 30 inside the extension portion 24 may be positioned as high as the outer surface of the second part 244 or closer to the solar cell panel 10, so as to be easily positioned inside the extension portion 24. Accordingly, the volume of the solar cell module 100 can be minimized, and the space at the back of the solar cell panel 10 can be effectively used. In addition, the problem of applying impacts to each other when a plurality of solar cell modules 100 are stacked on each other for transportation or the like after manufacturing may be minimized. Moreover, in some embodiments, the junction box 30 may be joined with the extension portion 24 of the frame 20 adjacent to the upper end portion of the solar cell panel 10 and/or may be attached to the back surface of the solar cell panel 10.

The junction box 30 according to some embodiments may be integrally formed by a terminal and/or a bypass diode.

In the junction box 30, the terminal connected to the solar cell (denoted by reference sign 12 of FIG. 3, hereinafter the same) (or the solar cell panel 10, hereinafter the same) and a bypass diode located between the terminal and the inverter may be electrically connected through a circuit pattern.

The terminal is connected to a solder strip 122 drawn from the solar cell 12 so as to be electrically connected to the solar cell panel, thereby receiving a DC voltage or DC current generated in the solar cell panel 10 and transmitting the DC voltage or DC current to the bypass diode.

The terminal to which the solder strip 122 is connected is positioned close to one side of the circuit board.

A plurality of terminals may be formed corresponding to the number of solder strips 122 so as to be in one-to-one correspondence to the solder strips 122. In some embodiments, the terminal may have a structure in which the solder strip 122 is detachable.

The bypass diode connected to the terminal is positioned in the circuit board through a circuit pattern extending from the terminal. The number (n−1) of the bypass diode is set to be one less than the number (n) of the terminal. The corresponding bypass diode may be connected to two terminals by a circuit pattern between the two terminals. When there is a part shaded by the solar cell panel 10 or a region where power cannot be generated due to failure, the bypass diode serves to protect the region by detouring the current. The structure of the bypass diode may be applied to various known structures.

In addition, the junction box 30 may further include a current sensor that serves to suspend operations of a capacitor, a DC-DC converter, and the like by sensing whether there is an abnormality or failure in the current supplied from the bypass diode. In some embodiments, the bypass diode and the current sensor may be connected inside a same housing by a circuit pattern formed on the circuit board.

Moreover, a capacitor that stores a DC current passing through the current sensor and transmits a current at a predetermined voltage to the DC-DC converter may be connected to the current sensor. In some embodiments, the current sensor and the capacitor may be connected in the same housing through a circuit pattern formed on the circuit board.

The current of a voltage becoming uniform in the capacitor may be transmitted to the DC-DC converter and converted into another DC voltage of a predetermined level. In some embodiments, a plurality of DC-DC converters may be provided.

DC output (as an example, a DC current or DC voltage) from the DC-DC converter is transmitted to the outside through an output cable 38. For example, the DC output is connected to another solar cell module 100 through the output cable 38, or transmitted to an external DC-AC inverter 400, or the like.

Various known structures are applied as the current sensor, the capacitor, and the DC-DC converter. In addition, various parts such as a control component and a communication component may be located on the circuit board.

The DC-AC inverter 400 may be formed at the exterior of the solar cell panel 10 to receive and convert DC output from the plurality of solar cell modules 100 and convert the DC output into AC output.

Herein, "integration" means including all situations that may be identified as a part, an article, an object, or a component when fixed to the solar cell panel 10 and/or the frame 20 during or after configuration. For example, "integration" may also mean positioned together inside a same housing and integrated by the same housing, or mean fixed by inserting into or attaching to a same component and integrated by the same component, or mean formed together in a same component to form part of the same component, or mean surrounded or fixed together by a same component. Conversely, connections via separate output cables or the like cannot be interpreted as integration. In this case, the terminal and the bypass diode may also be detachably integrated with each other, and be easily detached for maintenance and replacement by detachably integrated with each other.

The junction box 30 according to some embodiments enables the terminal and the bypass diode to be formed together on a circuit board with a circuit pattern (or current or wiring). Accordingly, it may be considered that the terminal and the bypass diode are integrated through the circuit board. Circuit boards formed with terminals and bypass diodes may be located inside a same housing. Therefore, the terminal and the bypass diode may also be regarded as integrated by the same housing.

The housing may provide a space where the terminal and the bypass diode integrated are positioned, and may have various structures and shapes that may be stably fixed to the solar cell panel 10 and/or the frame 20.

The junction box 30 may expose two output cables 38 (38*a* and 38*b*) to the outside, and the above two output cables 38 (38*a* and 38*b*) may be connected to the output cables 38 (38*a* and 38*b*) of the adjacent solar cell module 100 or connected to the DC-AC inverter 400 so as to be connected to a power grid, a power system, or the like.

The output cables 38 in some embodiments meet and are connected to the output cables 38 configured to be connected to other solar cell modules 100, the power grid, or the power system.

The output cable 38 includes two cables that output currents or voltages with polarities different from each other.

A (+) output cable 38*a* includes a first cable part 38*a* drawn out and extending from the junction box 30, and a first connector 90*a* at an end portion of the first cable part 38*a*.

A (−) output cable 38*b* includes a second cable part 38*b* drawn out and extending from the junction box 30, and a second connector 90*b* at an end portion of the second cable part 38*b*.

In the case that the second connector 90*b* is provided, the second connector 90*b* has an end connecting to the first connector 90*a*.

Herein, the second connector 90*b*, as part of the first connector 90*a* meeting the adjacent solar cell module 100, may form a series connection between two adjacent solar cell modules 100 by joining the first connector 90*a* and the second connector 90*b*.

In the first connector 90*a* and the second connector 90*b*, one may have a male connector structure, and the other may be provided with a female connector structure into which the male connector structure is inserted. As an example, since the first connector 90*a* has the female connector structure and the second connector 90*b* has the male connector structure, the first connector 90*a* and the second connector 90*b* can be easily connected and meet by inserting the second connector 90*b* into the first connector 90*a*. However, the present disclosure is not limited thereto.

The first connector 90*a* meets the second connector 90*b* of the adjacent solar cell module 100, so that the adjacent solar cell modules 100 can be connected to each other or to the power grid or the power system through the inverter 400 as shown in FIG. 4.

Referring to FIG. 4, a plurality of solar cell modules 101 and 102 may be easily connected by joining the first connector 90*a* of one solar cell module 101 to the second connector 90*b* of the solar cell module 102 adjacent thereto. That is, the solar cell module 101 and 102 are separately provided with respective junction boxes 30, and each solar cell module 101 has the first connector 90*a* and the second connector 90*b* positioned thereto so as to be to connected to the adjacent solar cell module 102. Therefore, after the plurality of solar cell modules 101 and 102 are positioned, the plurality of solar cell modules 101 and 102 can be easily connected by joining the first connector 90*a* and the second connector 90*b*. In addition, when the solar cell modules 100 are disconnected, the solar cell modules 100 may be detached from each other individually by disconnecting the first connector 90*a* from the second connector 90*b*. Therefore, disconnection may be easily achieved. In addition, in a case where there is failure or the like in one of the junction boxes 30, only the junction box 30 may be replaced.

Both the first connector 90*a* and the second connector 90*b* are arranged as described above, so that, in the case of failure or the like in one part, other parts can be used as they are by replacing only the defective part.

For clear and concise illustration, it is shown in FIG. 4 that the solar cell module 100 is provided with two solar cell modules (the first solar cell module 101 and the second solar cell module 102 adjacent to each other). However, more than three solar cell modules 100 may be provided in some other embodiments.

As shown in FIG. 4, in some embodiments, the first solar cell module 101 and the second solar cell module 102 adjacent to each other are connected to each other through the connection of the first output cable 90a of the first solar cell module 101 and the second output cable 90b of the second solar cell module 102.

In more detail, the output cable 38 of the junction box 30 of the first solar cell module 101 is connected to the first connector 90a of the first solar cell module 101 and the second connector 90b of the output cable 38 of the junction box 30 of the second solar cell module 102.

The first connectors 90a and the second connectors 90b are successively connected, so that the DC output cables 38 of the junction boxes 30 of the solar cell modules 100 can be connected in series through the first connectors 90a and the second connectors 90b.

The second connector 90b of the last solar cell module 103 among the plurality of solar cell modules 100 successively connected in series as described above may be connected to the connector 410a of the DC-AC inverter 400 formed at the outside to convert total DC output into AC output.

When a part to which the first connector 90a and the second connector 90b of the adjacent solar cell modules 101 and 102 are connected as described above is named as a connection part 90, a covering member 200 configured to externally protect the first connector 90a and the second connector 90b connected as described above is also included.

The covering member 200 configured to protect the connection part 90 to which the two connectors 90a and 90b are connected is described in detail below with reference to FIG. 5 to FIG. 11.

Figure 5:
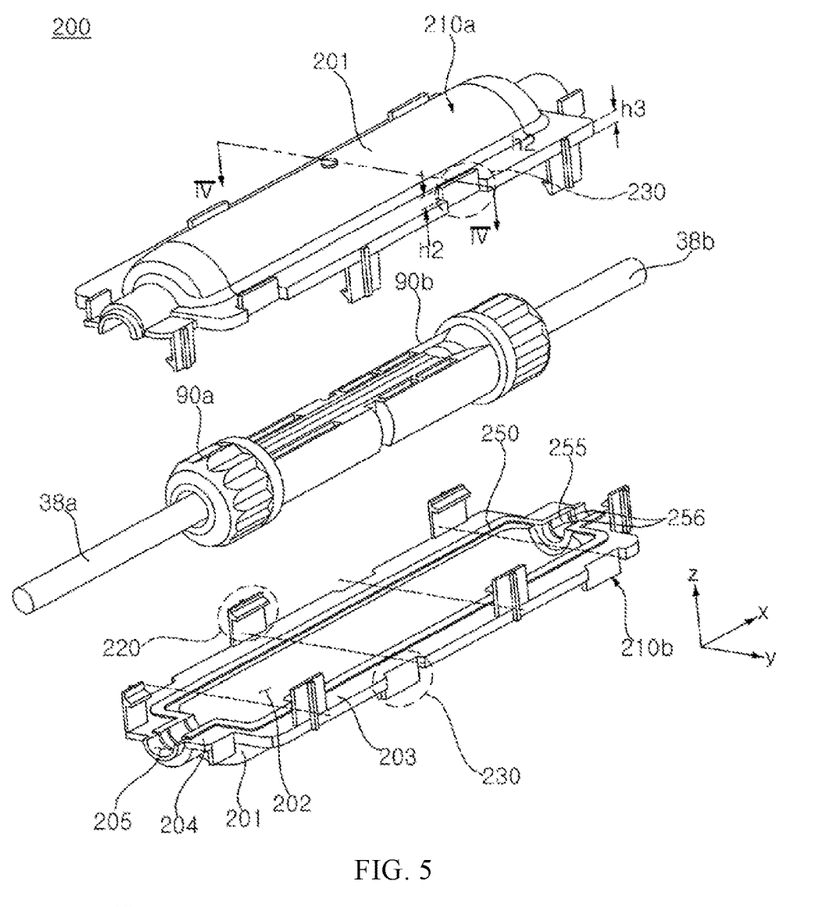
FIG. 5 is a perspective view of an enlarged and exploded connection part in FIG. 4.
Figure 6:
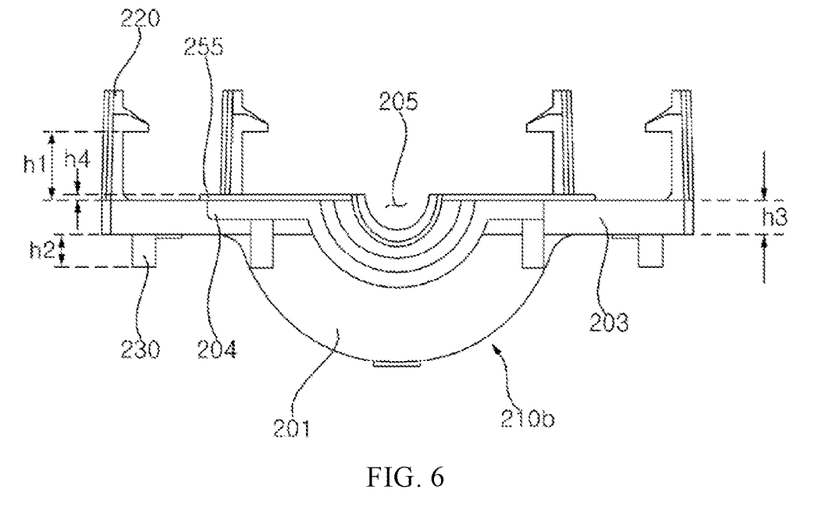
FIG. 6 is a diagram of a lower covering member of a covering member shown in FIG. 5 viewed from the front along an axis X.
Figure 7:
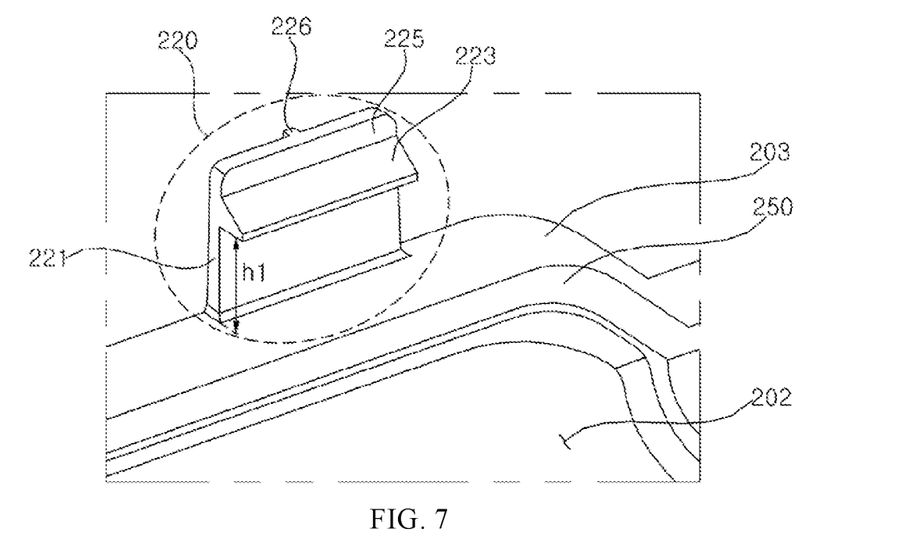
FIG. 7 is a diagram of the covering member shown in FIG. 5 viewed from above along an axis Z.
Figure 8:
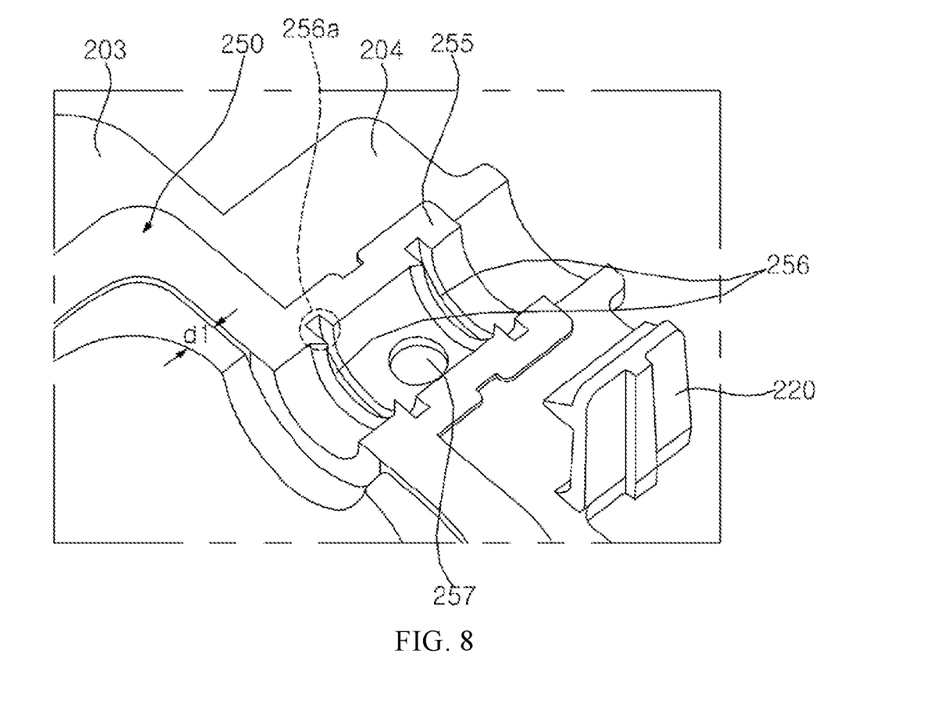
FIG. 8 is an enlarged view of a latch portion of the covering member shown in FIG. 5.
Figure 9:
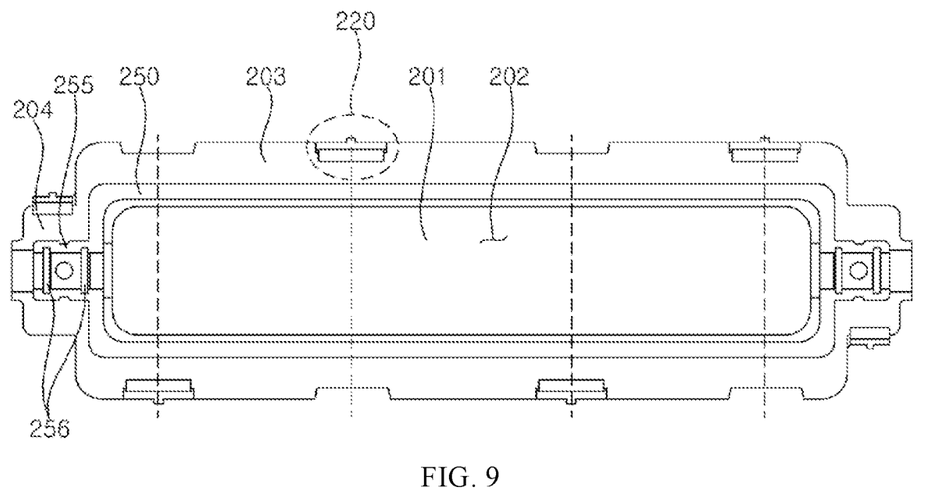
FIG. 9 is an enlarged view of a sealing portion of the covering member shown in FIG. 5.
Figure 10:
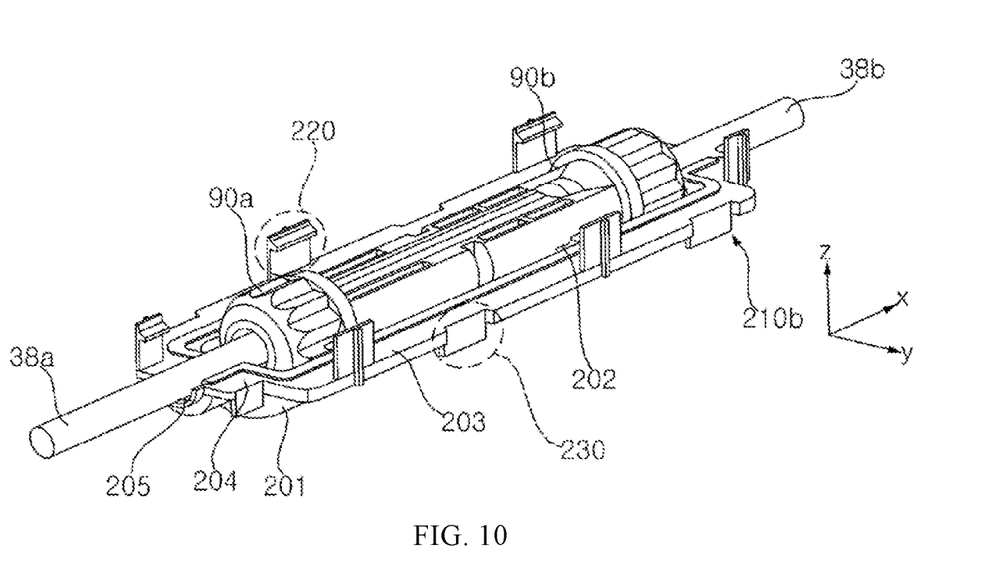
FIG. 10 is a diagram showing a state where a connector connected to the lower covering member is placed.
Figure 11:
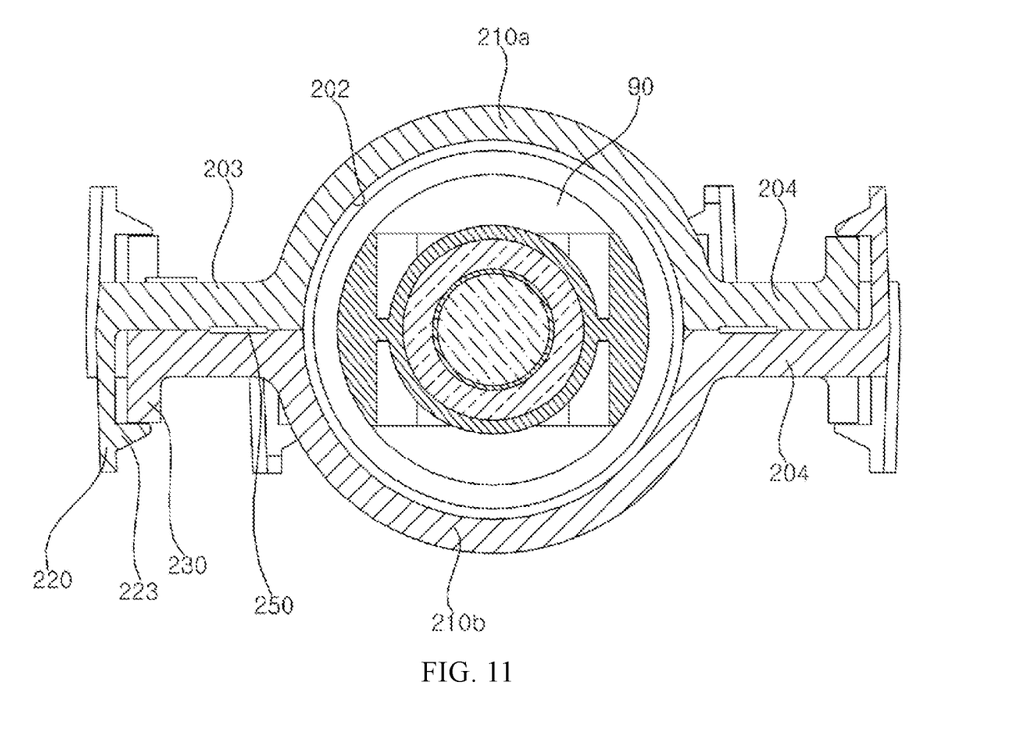
FIG. 11 is a sectional view taken in a state where the covering member in FIG. 5 accommodates the connection part.

FIG. 5 is a perspective view of an enlarged and exploded connection part in FIG. 4, FIG. 6 is a diagram of a lower covering member 200 of a covering member 200 shown in FIG. 5 viewed from the front along an axis X, FIG. 7 is a diagram of the covering member 200 shown in FIG. 5 viewed from above along an axis Z, FIG. 8 is an enlarged view of a latch portion 220 of the covering member 200 shown in FIG. 5, FIG. 9 is an enlarged view of a sealing portion 250 of the covering member 200 shown in FIG. 5, FIG. 10 is a diagram showing a state where a connector connected to the lower covering member 200 is placed, and FIG. 11 is a sectional view taken in a state where the covering member in FIG. 5 accommodates the connection part.

Referring to FIG. 5 to FIG. 11, the covering member 200 configured to protect the connecting part 90 according to some embodiments of the present disclosure includes two detachable covering members 200.

The two detachable covers 200 according to some embodiments are provided with the connection part 90 at a center in a length direction, and include an upper covering member 210a arranged at an upper part of the connection part 90 and a lower covering member 210b arranged at a lower part of the connection part 90.

Since the upper covering member 210a and the lower covering member 210b accommodate the upper part and the lower part of the connection part 90 and are coupled with each other, there is internally a structure that externally seals the connection part 90.

In this case, the covering member 500 in FIG. 5 enables the upper covering member 210a and the lower covering member 210b to have a same shape. The following description will be based on the lower covering member 210b.

The lower covering member 210b includes a housing 201 that is elongated in an X-axis direction, and the housing 201 includes a concave portion 202 recessing downwards to accommodate the lower part of the connection part 90.

The concave portion 202 is recessed downwards to have an elongated shape along the shape of the housing 201, and a cross section of the housing 201 cut in the vertical direction of the axis x to form the concave portion 202 has a semicircular shape, and has a cylindrical shape cut in the length direction as a whole.

Therefore, the lower part of the elongated connection part 90 is accommodated at the concave portion 202, whereby the upper part not accommodated as shown in FIG. 10 may have a shape protruding upwards toward the lower covering member 210b.

The upper part of the connection part 90 protruding upwards toward the lower covering member 210b, the upper covering member 210a is arranged on the lower covering member 210b and the lower covering member 210b is coupled with the upper covering member 210a, and the connection part 90 in the interior is sealed.

Therefore, when viewed from top to bottom as shown in FIG. 9, the concave portion 202 forms a space equivalent to half of the cylindrical shape.

The housing 201 includes a flange portion 203 surrounding the concave portion 202 and abutting against the upper covering member 210a.

That is, the flange portion 203 having a predetermined width is formed around the concave portion 202 of the housing 201.

The flange portion 203 is formed to have a predetermined width along an axis y and abuts against the flange portion 203 of the upper covering member 210a.

The predetermined width of the flange portion 203 may be formed to have a size ranging from 5 mm to 15 mm, but is not limited thereto.

The housing 201 formed as described above may be formed of a material with a uniform thickness so that the flange portion 203 is integrally formed while surrounding the concave portion 202 in a central region.

The housing 201 may be formed of plastic with high hardness, and a material such as polycarbonate resin may be used.

In addition, the housing 201 of the lower covering member 210b includes, at two ends of the housing 201 formed long in the length direction (x-axis direction), cable portions 204 configured to accommodate the cables 38a and 38b respectively connected to two ends of the connecting part 90.

That is, the cable portions 204 are formed respectively protruding at the two ends in the length direction from the central region of the housing 201 in which the concave portion 202 is formed.

As shown in FIG. 6 and FIG. 9, the cable portion 204 is configured to include a cable concave portion 205 recessed downwards (axis z) from the flange portion 203, and the cable concave portion 205 is also recessed to form a cylindrical shape.

In this case, a cross section of the cable concave portion 205 is formed as a semicircle with a diameter smaller than the concave portion 202.

Therefore, the cable concave portion 205 and the concave portion 202 recessed from the flange portion 203 may be connected to each other while having a terminal difference, and the connection of the cable concave portion 205 is formed to have gentle curvature from the concave portion 202.

In this case, the flange portion 203 further includes a sealing portion 250 in a region close to the concave portion 202.

The sealing portion 250 may surround the peripheral portion of the concave portion 202 and be formed at the flange portion 203, and the sealing portion 250 may be formed of resin having predetermined elasticity.

For example, the sealing portion 250 may be formed of low-hardness resin such as liquid silicon, liquid silicone rubber (LSR), polypropylene (PP), or thermoplastic elastomer (TPE), and may be formed to have a predetermined width. In this case, the width of the sealing portion 250 may be formed integrally and uniformly in the central region of the housing 201 and may be formed to satisfy ¼ to ½ of the width of the flange portion 203.

In addition, the sealing portion 250 may be formed closer to a central line of the flange portion 203 than an edge region towards the concave portion 202, and may be formed to be spaced apart by a first distance d1 in a bending region bending from the concave portion 202 and constituting the flange portion 203.

In this case, the first distance d1 may satisfy a range from 1 mm to 3 mm, but is not limited thereto.

In addition, the sealing portion 250 may be formed to protrude from a plane of the flange portion 203 upwards with a predetermined thickness, and a height h4 of the sealing portion 250 as described above may be determined according to the latch portion 220 described later.

As an example, the sealing portion 250 may be formed to have a thickness h4 ranging from 0.1 mm to 5 mm, but is not limited thereto.

In addition, the sealing portion 250 may be integrally formed in the cable concave portion 205.

The sealing portion 250 in the cable concave portion 205 may be formed to cover the entirety of the cable concave portion 205, but may be formed by excluding a predetermined distance between two ends in some other embodiments.

As shown in FIG. 9, the sealing portion 250 in the cable concave portion 205 may include at least one water barrier structure.

The at least one water barrier structure includes at least one groove 256 recessed in an axis −y direction in the sealing portion 250.

The groove 256 may be formed to have a predetermined width, and may be formed as a circular arc along a shape of the cable concave portion 205.

In this case, the groove 256 may be uniformly formed from the flange portion 203 on one side to the flange portion 203 on the other side along the circular arc of the cable concave portion 205.

When moisture or rainwater penetrates from the outside, the groove 256 formed as described above may perform the function of blocking the rainwater from entering the connection part 90 in the central region.

At least one groove 256 as described above may be formed in the cable concave portion 205 at one end, and more than two parallel grooves 256 may be formed as shown in FIG. 9 according to a certain design.

In this case, an injection groove 257 for insert injection may be formed in a region between the grooves 256 in FIG. 9, and the injection groove 257 as described above may also serve as a water barrier structure.

The injection groove 257 is formed in a circular shape, but is not limited thereto and may be implemented in various shapes.

The housing 210 and the sealing portion 250 constituting the lower covering member 210b can be manufactured simultaneously by insert injection.

In addition, for the water barrier structure, a lower end portion of the groove 256 may include a protrusion 256a protruding more outwards than an upper end portion.

That is, as shown in FIG. 9, the protrusion 256a protruding towards the cable 38a is formed on at least one wall of the groove 256 along the groove 256 so as to fix the cable 38a positioned at the cable concave portion 205.

The protrusion 256a as described above may also be positioned at the upper end portion of the groove 256, and as shown in FIG. 9, an upper part has a shape extending from the wall of the groove 256, but a lower part has an asymmetric shape abutting again the sealing portion 250 while having an inclination.

As described above, the housing 201 includes the cable concave portion 205 formed from the concave portion 202 accommodating the connection part 90 to the cable portion 204 at two ends in the central region, and the flange portion 203 is formed around each concave portion 202.

A plurality of latch portions 220 protrude towards the axis z at the edges of the flange portion 203 as described above.

The corresponding latch portions 220 have same configuration, and the following description is based on one latch portion 220 provided.

Referring to FIG. 8, the latch portion 220 has a shape protruding upwards in the z-axis direction from an edge region of the flange portion 203 and protruding towards the upper covering member 201a.

The latch portion 220 includes a protruding body portion 221 having a predetermined width, and includes a hook portion 223 protruding from the body portion 221 at a predetermined height h1 along the axis y to the central region where the concave portion 202 is formed.

As shown in FIG. 8, the hook portion 223 may have a same width as the body portion 221 and be formed laterally across the body portion 221, the lower surface of the hook portion 223 may be formed parallel to the plane of the flange portion 203, but an upper surface thereof may have a shape inclined from an inner wall of the body portion 221.

Therefore, the upper surface and the lower surface may meet on one side and are formed such that a cross section forms a right triangle together with the inner wall of the body portion 221.

As described above, in a case where the hook portion 223 of the latch portion 220 has a small thickness when moving from the inner wall of the body portion 221 to the outside, an elastic force of the hook portion 223 can be improved, and when a user hooks or detaches the latch portion 220 with or from the upper covering member 200, detachment may be performed with a small force, so that defects caused by a large force can be prevented.

In addition, the hook portion 223 may protrude at a predetermined height h1, and the height of the hook portion 223 may be the same as a thickness of the upper covering member 210a or a thickness of a hook protrusion 230 to the upper covering member 210a.

In FIG. 5, it is shown that the latch portions 220 as described above are arranged to be staggered from each other with respect to the two flange portions 203 formed long on the axis x.

That is, in a case where two latch portions 220 are formed at the flange portion 203 on one side, the flange portion 203 on the other side may be positioned in a zigzag shape to be staggered from the flange portion 203 on one side.

The latch portion 220 as described above may also be formed at the cable portion 204, and when one latch portion 220 is formed at the left flange portion 203 of the cable portion 204 at one end, it is shown that one latch portion 220 is formed at the right flange portion 203 of the cable portion 204 at the other end, which are formed diagonal to each other.

As described above, the latch portion 220 is formed so as not to face each other in the left flange portion 203 and the right flange portion 203 in the length direction, so that coupling or detachment can be performed without application of a strong force when the upper covering member 210a and the lower covering member 210b are joined by the latch portion 220 or detached by unlocking the latch portion 220.

In the case of the covering member 200 made of a plastic material, when a strong force is applied in order to cause bending of the latch portion 220 for joining or release thereof, the plastic forming the housing 201 has strong hardness, and the housing 201 may be damaged.

Therefore, as described above, the latch portions 220 on the two sides are formed so as not to face each other and may form a structure where detachment is possible without the application of a strong force.

In addition, the hook protrusion 230 protruding downwards may be formed at the flange portion 203 on the side opposite to the latch portion 220, but is not limited thereto.

In a case where the hook protrusion 230 is configured to have a predetermined height h2, a height H1 of the hook portion 223 of the latch portion 220 is formed to be the same as a sum of a thickness of the covering member 200 and a protruding height h2 of the hook protrusion 230.

In a case where the hook protrusion 230 is formed as described above, as the length of the body portion 221 of the latch portion 220 becomes longer, the elastic force of the latch portion 220 at the time of joining and detachment may become larger, and the latch portions 220 can be detached with a small force.

The configuration of the lower covering member 210b as described above may be the same as the upper covering member 210a, and in a case where the configuration of the two covering members 210a and 210b is the same as described above, it is favorable on production, transportation, and storage.

As shown in FIG. 5, when the connection part 90 where the connectors 90a and 90b of the two cables are connected is arranged therebetween while the two covering members 200 with the same configuration are arranged to face each other, the upper covering member 210a and the lower covering member 210b having the same configuration enable the latch portions 220 to be arranged opposite from left to right, so that the latch portions 220 of the upper covering member 210a are correspondingly arranged to match the hook protrusion 230 of the lower covering member 210b.

Therefore, as shown in FIG. 11, the two covering members 210a and 210b are completely joined by coupling the hook portions 223 and the hook protrusions 230 of the corresponding latch portions 220 to be hooked to each other, and the connection part 90 is sealed by coupled in the cylindrical concave portion 202 formed inside as described above.

The sealing of the connection part 90 as described above may be implemented by making the sealing portion 250 pressed by the coupling of the two covering members 210a and 210b to completely block moisture or air from the outside.

The sealing portion 250 as described above may seal the concave portion 202 between the two covering members 210a and 210b, thereby preventing impurities, pollutants, and the like from flowing in from the outside and improving sealing properties and waterproof properties.

In some embodiments, although a protrusion structure for fixing the cables 38a and 38b to the cable portion 204 is provided, in some other embodiments, the cables may be fixed by an elastic component such as an O-shaped ring or rubber.

In the present disclosure, the coupling according to the plurality of latch portions 220 is implemented without addition of any external physical fixing component such as an additional bolt or screw.

As mentioned above, there is no need to add any external physical fixing component, so the stress caused by long-term fixing is reduced, thereby prolonging the service life of the covering members 210a and 210b, and further helping to protect the internal connection part from cracks and the like.

Some other embodiments of the present disclosure are described below with reference to FIG. 12.

Figure 12:
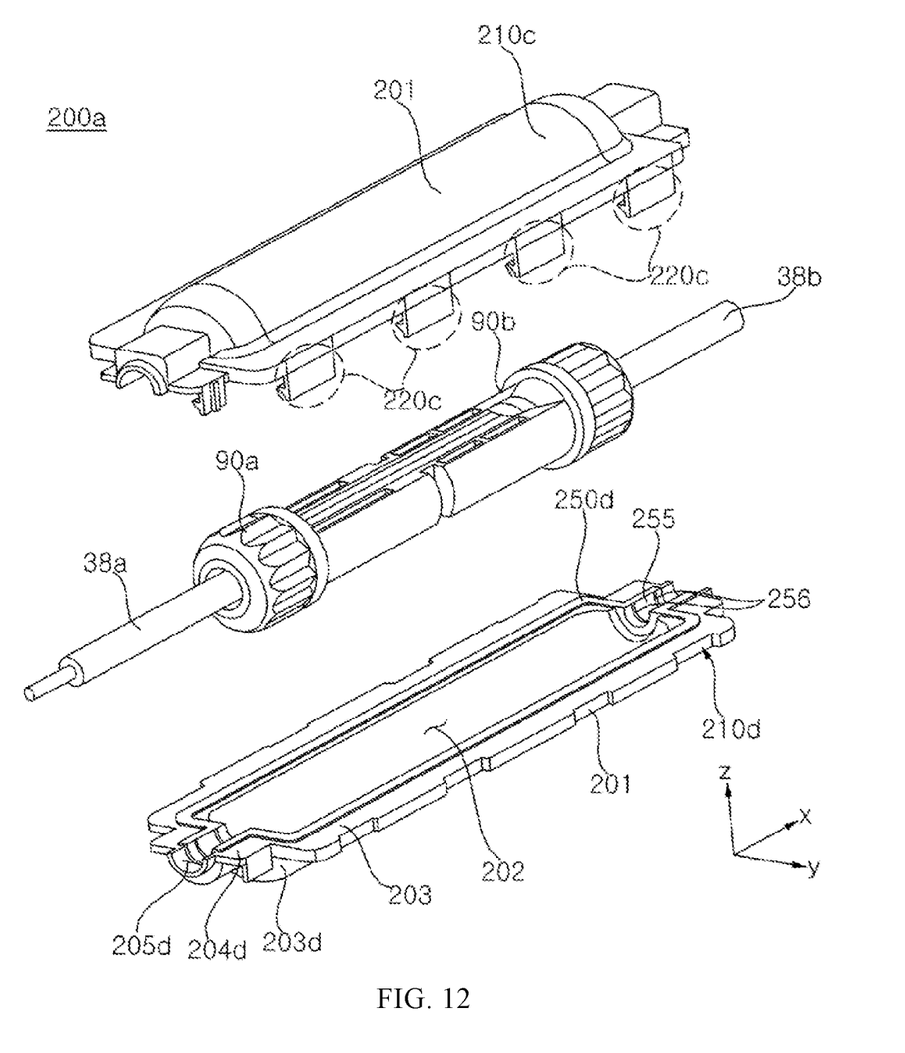
FIG. 12 is an exploded perspective view showing a structure of a covering member according to some other embodiments of the present disclosure.

As shown in FIG. 12, in the covering member 200 according to some other embodiments of the present disclosure, an upper covering member 210c and a lower covering member 210d have shapes different from each other.

In the upper covering member 210c and the lower covering member 210d, configuration of the concave portion 202 and the cable portion 204 of the housing 201 is the same, and the configuration of the sealing portion 250 is also the same, detailed description thereof is omitted.

In this case, in the lower covering member 210d, the latch portion 220 as in the embodiment in FIG. 5 is not formed at the flange portion 203d.

That is, the flange portion 203d extending in a horizontal direction around the concave portion 202 does not include the plurality of latch portions 220 protruding in the axis Z.

In addition, the upper covering member 210c includes a plurality of latch portions 220c protruding downwards along the axis z.

In this case, the plurality of latch portions 220c may be formed in a same number at left and right flange portions 203d as shown in FIG. 12, and positions on two sides may be formed to face each other.

In this case, the latch portions 220c of the upper covering member 210c in FIG. 12 may have a greater quantity than the latch portions 220 of the upper covering member 210a in FIG. 5.

As described above, the covering member 200 according to some other embodiments has an advantage that the latch portion 220c is formed only one side to make coupling and detachment simple.

The features, structures, effects, and the like above are included in at least one embodiment of the present disclosure, and are not necessarily limited to only one embodiment. In addition, the features, structures, effects, and the like exemplified in various embodiments can also be implemented by combining or modifying other embodiments by those of ordinary skill in the art to which the embodiments belong. Therefore, content related to such combinations and modifications should be construed as being included in the scope of the present disclosure.

What is claimed is:

1. A solar power-generating device, comprising:
a plurality of solar cell modules at least including a first solar cell module and a second solar cell module adjacent to each other; and
a covering member configured to protect a connection part that electrically connects the first solar cell module to the second solar cell module,
wherein each of the plurality of solar cell modules includes:
a solar cell panel;
a frame fixed to a peripheral portion of the solar cell panel; and
a junction box including a DC output cable connected to the solar cell panel to receive DC output and transmit the received DC output to the outside,
wherein, when the DC output cable of the first solar cell module and the DC output cable of the second solar cell module are connected to each other by connectors to realize the connection part, the covering member seals and protects the connection part;
the covering member includes:
a lower covering member covering a lower part of the connection part; and
an upper covering member covering an upper part of the connection part and coupled with the lower covering member to seal the connection part;
wherein the lower covering member or the upper covering member includes:
a body portion including a concave portion formed for accommodating the connection part, and a cable concave portion formed for accommodating a DC output cable protruding to two ends of the concave portion and connected to the connection part; and
a flange portion extending around the concave portion and the cable concave portion and abutting against the upper covering member or the lower covering member.

2. The solar power-generating device according to claim 1, wherein the lower covering member has a same shape as the upper covering member.

3. The solar power-generating device according to claim 1, wherein in the lower covering member, a cable portion accommodating the DC output cable connected to the connection part is arranged at two ends of the concave portion.

4. The solar power-generating device according to claim 3, wherein the connector of the first solar cell module and the connector of the second solar cell module are connected to each other to form the connection part and are accommodated in the concave portion, and the DC output cable connected to one end of the connector is accommodated in a cable concave portion of the cable portion.

5. The solar power-generating device according to claim 4, wherein the flange portion further includes:
a sealing portion surrounding the concave portion and externally sealing the concave portion.

6. The solar power-generating device according to claim 5, wherein the sealing portion protrudes at a predetermined height from the flange portion.

7. The solar power-generating device according to claim 6, wherein the sealing portion has lower hardness than the flange portion and the concave portion.

8. The solar power-generating device according to claim 7, wherein the lower covering member further includes:
a plurality of latch portions protruding upwards from an edge of the flange portion and joining with the upper covering member.

9. The solar power-generating device according to claim 8, wherein the plurality of latch portions are spaced apart and staggered from each other by taking the concave portion as the center.

10. The solar power-generating device according to claim 9, wherein the flange portion further includes:
protrusions protruding downwards at positions facing the latch portions.

11. The solar power-generating device according to claim 10, wherein, in the upper covering member and the lower covering member arranged to accommodate the connection part, the latch portions are coupled to the protrusions.

12. The solar power-generating device according to claim 8, wherein the plurality of latch portions of the lower covering member are spaced apart from and facing each other by taking the concave portion as the center.

13. The solar power-generating device according to claim 12, wherein the upper covering member includes:
a plurality of protrusions protruding upwards and respectively connected corresponding to the plurality of latch portions of the lower covering member.

14. A connector covering member for a solar cell device, wherein the connector covering member is configured to protect a connection part electrically connecting solar cell modules adjacent to one another, and the connector covering member for the solar cell device comprises:
a lower covering member covering a lower part of the connection part; and
an upper covering member covering an upper part of the connection part and coupled with the lower covering member to seal the connection part;
wherein the lower covering member or the upper covering member includes:
a body portion including a concave portion formed for accommodating the connection part, and a cable concave portion formed for accommodating a DC output cable protruding to two ends of the concave portion and connected to the connection part; and
a flange portion extending around the concave portion and the cable concave portion and abutting against the upper covering member or the lower covering member.

15. The connector covering member for a solar cell device according to claim 14, wherein a connector of one solar cell module and a connector of another solar cell module are in contact with each other to form the connection part which is accommodated in the concave portion, and the DC output cable is connected to one end of the corresponding connector and is accommodated in the cable concave portion.

16. The connector covering member for a solar cell device according to claim 15, wherein the flange portion further includes:
a sealing portion surrounding the concave portion and protruding at a predetermined height to externally seal the concave portion,
wherein the sealing portion is integrally formed in the cable concave portion.

17. The connector covering member for a solar cell device according to claim 16, wherein the lower covering member or the upper covering member further includes:
a plurality of latch portions protruding upwards from an edge of the flange portion and joining with the upper covering member; and
a plurality of protrusions protruding downwards at positions facing the plurality of latch portions.

18. A solar power-generating device, comprising:

a plurality of solar cell modules at least including a first solar cell module and a second solar cell module adjacent to each other; and a covering member configured to protect a connection part that electrically connects the first solar cell module to the second solar cell module, wherein each of the plurality of solar cell modules includes:

a solar cell panel;

a frame fixed to a peripheral portion of the solar cell panel; and a junction box including a DC output cable connected to the solar cell panel to receive DC output and transmit the received DC output to the outside, wherein, when the DC output cable of the first solar cell module and the DC output cable of the second solar cell module are connected to each other by connectors to realize the connection part, the covering member seals and protects the connection part;

the covering member includes:

a lower covering member covering a lower part of the connection part; and an upper covering member covering an upper part of the connection part and coupled with the lower covering member to seal the connection part;

wherein the lower covering member has a same shape as the upper covering member; and wherein the lower covering member or the upper covering member includes:

a body portion including a concave portion formed for accommodating the connection part, and a cable concave portion formed for accommodating a DC output cable protruding to two ends of the concave portion and connected to the connection part; and a flange portion extending around the concave portion and the cable concave portion and abutting against the upper covering member or the lower covering member.

19. The solar power-generating device according to claim 18, wherein in the lower covering member, a cable portion accommodating the DC output cable connected to the connection part is arranged at two ends of the concave portion.

* * * * *